Dec. 27, 1927. 1,654,426
W. MARSHALL
HINGE CONSTRUCTION FOR DOORS
Filed March 2, 1925    2 Sheets-Sheet 1
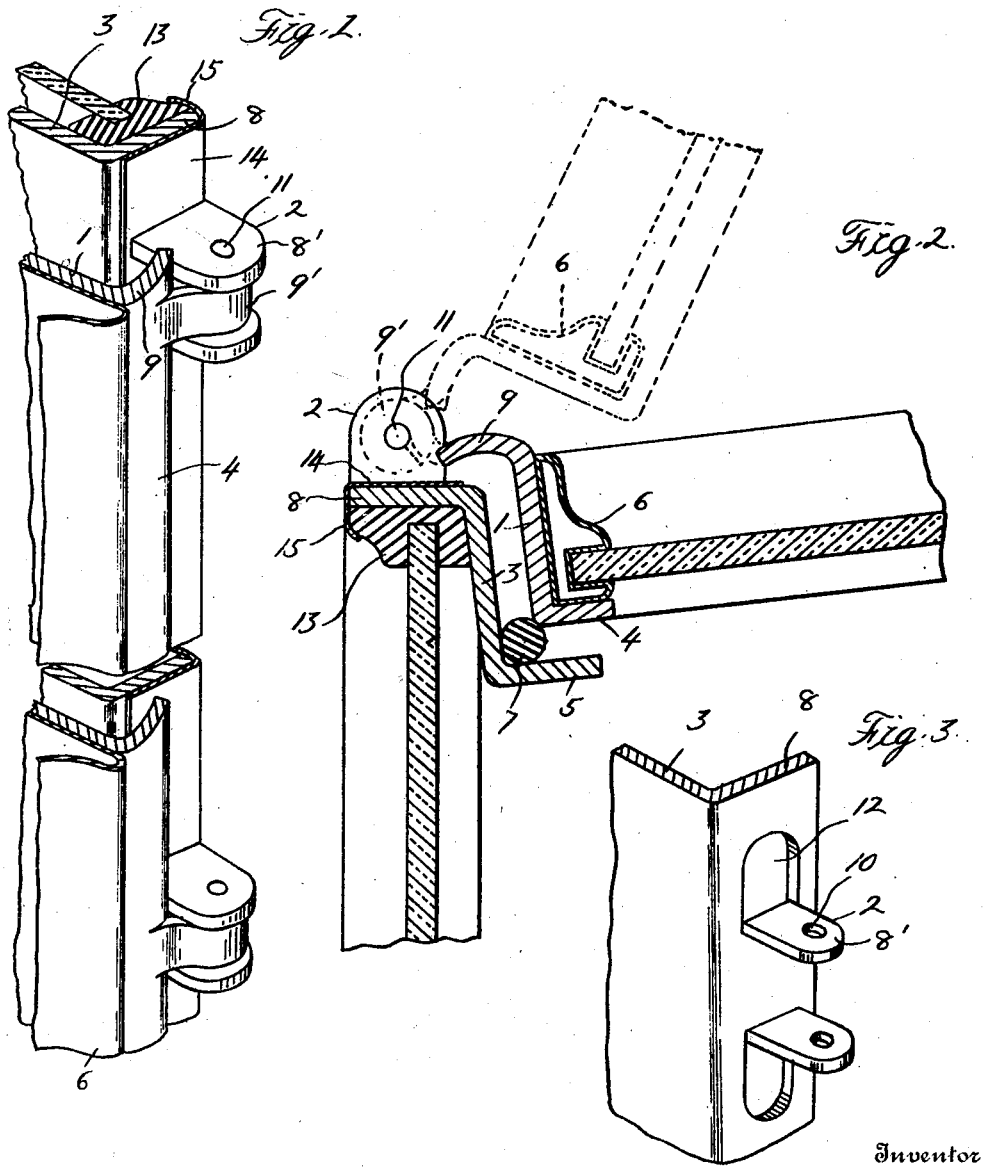
Inventor
William Marshall Dec. 27, 1927.  
W. MARSHALL  
1,654,426  
HINGE CONSTRUCTION FOR DOORS  
Filed March 2, 1925  2 Sheets-Sheet 2

Inventor  
William Marshall  
By Whittemore Hulbert Whittemore  
& Belknap  
Attorneys Patented Dec. 27, 1927.

1,654,426

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

HINGE CONSTRUCTION FOR DOORS.

Application filed March 2, 1925. Serial No. 12,716.

This invention relates generally to hinge constructions particularly designed for connecting doors and the like and consists of certain novel features of construction, combinations and arrangements of parts as will be more fully described and particularly pointed out in the appended claims.

In the accompanying drawing:

Figure 1 is a perspective view of a hinge construction embodying my invention.

Figure 2 is a cross sectional view thereof.

Figure 3 is a fragmentary perspective view of the body hinge pillar.

Figure 4:
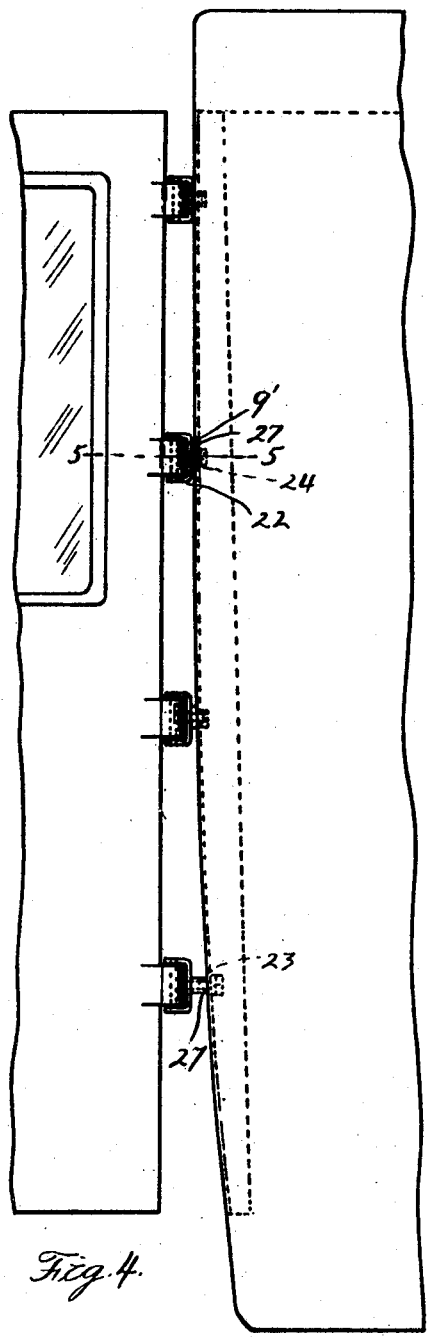
Figure 4 is a fragmentary side elevation of a slightly modified form of construction.

Referring now to the drawing in which like characters of reference designate corresponding parts throughout the several views, the numeral 1 designates a door pillar that is pivotally connected by means of hinges 2 to a supporting post or pillar 3, preferably of a vehicle body of the closed type. As shown, the pillars 1 and 3 are preferably formed of flat metal bars and are provided at their opposite edges with laterally extending flanges. The flange 4 of the pillar 1 preferably projects rearwardly and forms an abutment for the inner face of suitable window molding 6 which is secured to the rear face of the pillar 1, while the flange 5 of the pillar 3 preferably projects rearwardly also but cooperates with the pillar 3 for receiving a suitable weather strip 7 that is adapted to be engaged by the pillar 1 when the door is closed, for excluding rain, dust etc., from the inside of the vehicle body.

As shown, the flange 8 of the pillar 3 preferably projects forwardly and is provided at spaced points intermediate the upper and lower ends thereof with laterally projecting spaced lugs 8', while the flange 9 of the pillar 1 preferably projects forwardly and is provided at spaced points intermediate the upper and lower ends thereof with forwardly projecting return-bent portions 9' that extend between the lugs 8' and register with aligned openings 10 in the lugs. Suitable pintles 11 preferably extend through the return-bent portions 9' and the aligned openings 10 in the lugs 8' for connecting the door pillar 1 to the supporting pillar 3 of the vehicle body.

In order that the openings 12 formed in the pillar when the lugs 8' are struck out, will be concealed and that the resilient windshield molding 13 will be held in place against the pillar 3, I preferably provide a neat finish strip 14 that covers the outer face of the flange 4 and is provided at its forward edge with a lateral flange 15 that overlaps the forward edge of the molding 13 and holds the latter firmly against the pillar 3 and the inner face of the flange 4.

From the foregoing description it will be readily apparent that I have provided a strong and durable hinge construction in which the cooperating hinge parts are preferably formed integral with the pillar of the door and the hinge post of the vehicle body. As a result, the door may be easily and quickly attached to the pillar 3 of the vehicle body.

It will also be apparent that the hinge post is provided with a neat finish strip that seals the openings provided by the struck out lugs constituting the main hinge parts and that holds in fixed position the channel molding receiving the windshield glass panel. Inasmuch as the return bent portions 9' project forwardly from the flange 4 of the pillar 1, it is readily apparent that the forward edge of said flange 4 will cooperate with the inner edges of the lugs 8' to limit the inward swinging movement of the door.

Figure 5:
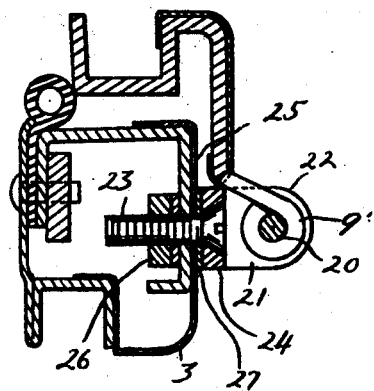
Figure 5 is a horizontal sectional view taken on the line 5—5 of Figure 4.

In Figures 4 and 5 I have shown a slight modification in which the return bent hinge parts 9' of the door pillar are preferably pivoted on vertical pintles 20 which extend through the parallel arms 21 of vertically spaced U-shaped brackets 22 secured to the pillar 3 of the body. As shown, these pintles 20 are preferably secured to the pillar 3 by suitable bolts or screws 23 which extend freely through the bases 24 of the brackets and adjacent wall 25 of the pillar 3 and are retained in position by suitable nuts 26 threaded thereon within the pillar. In order that the pintles 20 may be aligned preliminary to mounting the door, I preferably provide suitable spacers 27 that are preferably sleeved upon the screws 23 between the pillar 3 and the bases 24 of the brackets. Thus, the brackets may be adjusted laterally of the pillar 3 by merely employing spacers of different lengths. Moreover a single screw or bolt will suffice for each bracket.

Hence this construction obviates the necessity of making a large number of holes in the hinge parts and pillars which would otherwise require considerable time and labor to mount the doors. Furthermore, the assembly is a simple one and may be manufactured at a comparatively low cost. It will also be noted that each bracket 22 is pivoted on a horizontal bolt, and each hinge part 9' is pivoted on a vertical pintle carried by a bracket, consequently a universal connection is provided between the door pillar and supporting pillar. The lateral adjustment of the bracket may also be used to advantage in taking care of any irregularities in the construction of either the door or its supporting pillar.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a hinge construction, a door pillar having a forwardly extending projection, and a supporting pillar therefor, a flange projecting forwardly from the door pillar, a flange projecting forwardly from the supporting pillar, lugs projecting laterally from the last flange, and a projection upon the first flange pivotally connected to said lugs.

2. The combination with a door pillar, and a supporting pillar therefor, of substantially U-shaped brackets having the bases thereof secured to the supporting pillar and having spaced laterally extending arms, a pivot element carried by said arms, and projections integral with the door pillar having a portion return-bent around the pivot element.

3. The combination with a door pillar, and a supporting pillar therefor, of supporting brackets, headed elements securing the brackets to the supporting pillar, spacers between said brackets and pillar, and means for pivotally connecting the door pillar to the supporting pillar including cooperating hinge parts secured respectively to said door pillar and brackets.

4. The combination with a door, and a supporting pillar therefor, of supporting brackets secured to the supporting pillar having spaced arms, pivot elements carried by said arms, headed elements extending through said brackets and supporting pillar, means for adjusting said brackets including spacers sleeved upon said headed elements between the brackets and supporting pillar, and lugs integral with and projecting from the door pillar having a portion return-bent around the pivot element.

5. The combination with a door pillar, and a supporting pillar therefor, of substantially U-shaped supporting brackets having spaced parallel arms adjustably secured to the supporting pillar, a pivot element carried by said arms, and projections on the door pillar having a portion embracing said pivot element between the parallel arms.

6. The combination with a door pillar, and a supporting pillar therefor, of substantially U-shaped supporting brackets, headed elements extending through the base of said U-shaped brackets and through the supporting pillar, means whereby the brackets may be adjusted laterally of the supporting pillar including spacers sleeved upon said headed elements and disposed between the base portions of said brackets and said supporting pillar, and means for pivotally connecting the door pillar to the supporting pillar including cooperating hinge parts secured respectively to said pillar and brackets.

In testimony whereof I affix my signature.

WILLIAM MARSHALL.